UNITED STATES PATENT OFFICE.

PATRICK N. MACKAY, OF SAN FRANCISCO, CALIFORNIA.

IMPROVEMENT IN FLUXES FOR TREATING ORES.

Specification forming part of Letters Patent No. 159,831, dated February 16, 1875; application filed December 31, 1874.

*To all whom it may concern:*

Be it known that I, PATRICK N. MACKAY, of San Francisco city and county, State of California, have invented an Improvement in Fluxes for Treating Ores; and I do hereby declare the following description sufficient to enable any person skilled in the art or science to which it most nearly appertains to make and use my said invention or improvement.

My invention relates to an improvement in the flux for treating ores and metals for which Letters Patent No. 145,580 were issued to me on the 16th day of December, 1873.

My improvement consists in combining the mineral cryolite with the crude borax, or any of the borates, silica, and chloride of sodium claimed in my former patent in preparing the flux. For instance, in purifying iron or steel containing an excess of silicon, I use two per cent. of either of the borates, two per cent. of cryolite, and five per cent. of chloride of sodium, mixed intimately together as a dry powder, and injected into the molten mass through the tuyeres. In fact, this invention consists in the addition of from one to five per cent. of cryolite to the fluxes which I described in my former patent.

Having thus described my invention, what I claim, and desire to secure by Letters Patent, is—

A flux or refining compound of borax or any of the borates, or crude borax, with silica in the form of infusorial earth or silicious diatoms, cryolite, and chloride of sodium, substantially as herein set forth.

In witness whereof I hereunto set my hand and seal.

PATRICK N. MACKAY. [L. S.]

Witnesses:
JOSEPH GRUSS,
E. A. SCHULTZ.